(12) United States Patent
Hassan et al.

(10) Patent No.: US 9,408,132 B2
(45) Date of Patent: Aug. 2, 2016

(54) RADIO WHITE SPACE DATABASE DISCOVERY

(71) Applicant: Microsoft Corporation, Redmond, WA (US)

(72) Inventors: Amer A. Hassan, Kirkland, WA (US); Paul W. A. Mitchell, Seattle, WA (US); Paul W. Garnett, Albany, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 13/858,952

(22) Filed: Apr. 9, 2013

(65) Prior Publication Data
US 2014/0301242 A1 Oct. 9, 2014

(51) Int. Cl.
*H04W 40/24* (2009.01)
*H04W 16/14* (2009.01)

(52) U.S. Cl.
CPC .............. *H04W 40/24* (2013.01); *H04W 16/14* (2013.01)

(58) Field of Classification Search
CPC .............................. H04W 16/14; H04W 40/24
USPC ......................................................... 370/254
See application file for complete search history.

(56) References Cited

U.S. PATENT DOCUMENTS

| 2005/0078624 A1 | 4/2005 | Shu et al. |
| 2011/0176494 A1 | 7/2011 | Huang et al. |
| 2012/0246247 A1 | 9/2012 | Lim et al. |
| 2012/0314658 A1* | 12/2012 | Kim ........................ H04H 20/42 370/328 |
| 2013/0103684 A1* | 4/2013 | Yee ......................... H04W 16/14 707/736 |
| 2013/0300941 A1* | 11/2013 | Kafle et al. ..................... 348/725 |

FOREIGN PATENT DOCUMENTS

| WO | 2012/003566 A1 | 1/2012 |
| WO | 2012/025788 A1 | 3/2012 |

OTHER PUBLICATIONS

S. Probasco et al., 'Protocol to Access White Space database: PS, use cases and rqmts', Sep. 9, 2011, Working Group Draft, pp. 1-25.*
"International Search Report and Written Opinion" from: PCT/US2014/033119, Mailed Date: Nov. 17, 2014, 11 pages.
Nakai, et al., "Wi-Fi Access Point Discovery System for Mobile Users", Retrieved at <<http://ieeexplore.ieee.org/stamp/stamp.jsp?tp=&arnumber=5930097>>, In Eighth International Joint Conference on Computer Science and Software Engineering (JCSSE), May 11, 2011, pp. 5.

(Continued)

*Primary Examiner* — Melvin Marcelo
(74) *Attorney, Agent, or Firm* — Steve Wight; Sandy Swain; Micky Minhas

(57) ABSTRACT

The concepts relate to radio white space utilization and more specifically to discovery of radio white space databases that cover a specific location. One example can communicate a location to a radio white space database. The example can obtain, from the radio white space database, information about another radio white space database that covers the location. The example can supply the location to the another radio white space database. The example can also receive a set of radio white space frequencies and associated constraints for the location from the another radio white space database. The example can further communicate data over individual radio white space frequencies of the set in accordance with the constraints at the location.

20 Claims, 6 Drawing Sheets

(56) References Cited

OTHER PUBLICATIONS

"Softap Is Windows 7 Creating a Hole in Your Network Security", Retrieved at <<http://coggstinoxpo1985.wordpress.com/2012/12/06/softap-is-windows-7-creating-a-hole-in-your-network-security/>>, Dec. 6, 2012, pp. 2.

Wexler, Joanie., "The Curse of the Mobile Hotspot", Retrieved at <<http://www.webtorials.com/discussions/2012/06/the-curse-of-the-mobile-hotspot.html>>, Jun. 19, 2012, pp. 3.

Han, et al., "DozyAP: Power-Efficient Wi-Fi Tethering", Retrieved at <<http://research.microsoft.com/pubs/165617/DozyAP-MobiSys2012.pdf>>, In MobiSys'2012—The 10th International Conference on Mobile Systems,Applications and Serviceszzz, Jun. 25, 2012, pp. 14.

"eS-WiFi Module Software Enabled Access Point", Retrieved at <<http://www.inventeksys.com/2012/09/es-wifi-module-software-enabled-access-point/>>, Sep. 11, 2012, pp. 6.

"Written Opinion of the International Preliminary Examining Authority", From PCT Patent Application No. PCT/US2014/033119, Mailed Mar. 10, 2015, 6 pages.

"PCT Demand and Response to International Search Report and Written Opinion," Filed Feb. 16, 2015, from PCT Patent Application No. PCT/US2014/033119, 16 pages.

International Preliminary Report on Patentability mailed Jul. 21, 2015 from PCT Patent Application No. PCT/US2014/033119, 14 pages.

Voluntary Amendment filed Mar. 24, 2016 from China Patent Application No. 201480020495.2, 8 pages.

\* cited by examiner

RADIO WHITE SPACE DATABASE DISCOVERY

BACKGROUND

Ever increasing numbers of wireless devices are being introduced and sold. As such, the radio frequency (RF) spectrum available for these wireless devices to communicate continues to get more and more crowded. More efficient use of the RF spectrum and sharing under-utilized portions of the RF spectrum are very important to meet the growing number of wireless devices. One portion of the RF spectrum that is under-utilized is the portion reserved for broadcasting, such as television (TV) broadcasting. Governmental regulators divided the TV portion or range (and/or other portions) into a plurality of channels. However, for any given geographic region many of the channels are not utilized for TV or radio broadcasting.

Unused channels or frequencies of the reserved TV portion of the RF spectrum can be referred to as TV white space. It is possible to utilize these TV white spaces for other uses, however, their use tends to be tightly regulated by governmental institutions (such as the Federal Communications Commission in the United States).

These governmental institutions are establishing databases that map channel or frequency utilization to geographic location. Stated another way, for a given location, the database can indicate a sub-set of frequencies that are utilized (e.g., allocated) for TV broadcasting and other licensed use (such as wireless microphones in some countries) and/or a different sub-set of frequencies that are TV white spaces.

SUMMARY

The described implementations relate to radio white space utilization and more specifically to discovery of radio white space databases that cover a specific location. One example can communicate a location to a radio white space database. The example can obtain, from the radio white space database, information about another radio white space database that covers the location. The example can supply the location to the another radio white space database. The example can also receive a set of radio white space frequencies and associated constraints for the location from the another radio white space database. The example can further communicate data over individual radio white space frequencies of the set in accordance with the constraints at the location.

Another example can receive a communication relating to a location of a mobile device. The example can identify one or more radio white space databases that cover the location. The example can send information about the one or more radio white space databases to the mobile device or send the location and information about the mobile device to the one or more databases.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

This patent relates to utilizing radio white space frequencies. More specifically the patent relates to the ability of a device to contact radio white space (RWS) database(s) that cover a location of the device. The device can obtain a set of radio white space frequencies (RWSFs) from the RWS database. The device can then communicate data over one or more frequencies of the obtained set of RWSFs.

As mentioned above, RWSFs can include TV white space frequencies and/or other RWSFs. As used herein a "TV white space frequency" means a frequency or frequency range that was reserved for TV broadcasting, but which is not actually used for TV broadcasting in a particular geographic region. Similarly, "radio white space frequency" means a frequency or frequency range that was reserved for TV broadcasting, for other radio broadcasting, or two way radio communications, but which is not actually used in such manner in a particular geographic region. Stated another way, radio white space can refer to allocated but unused portions of the radio spectrum.

System Examples

Figure 1:
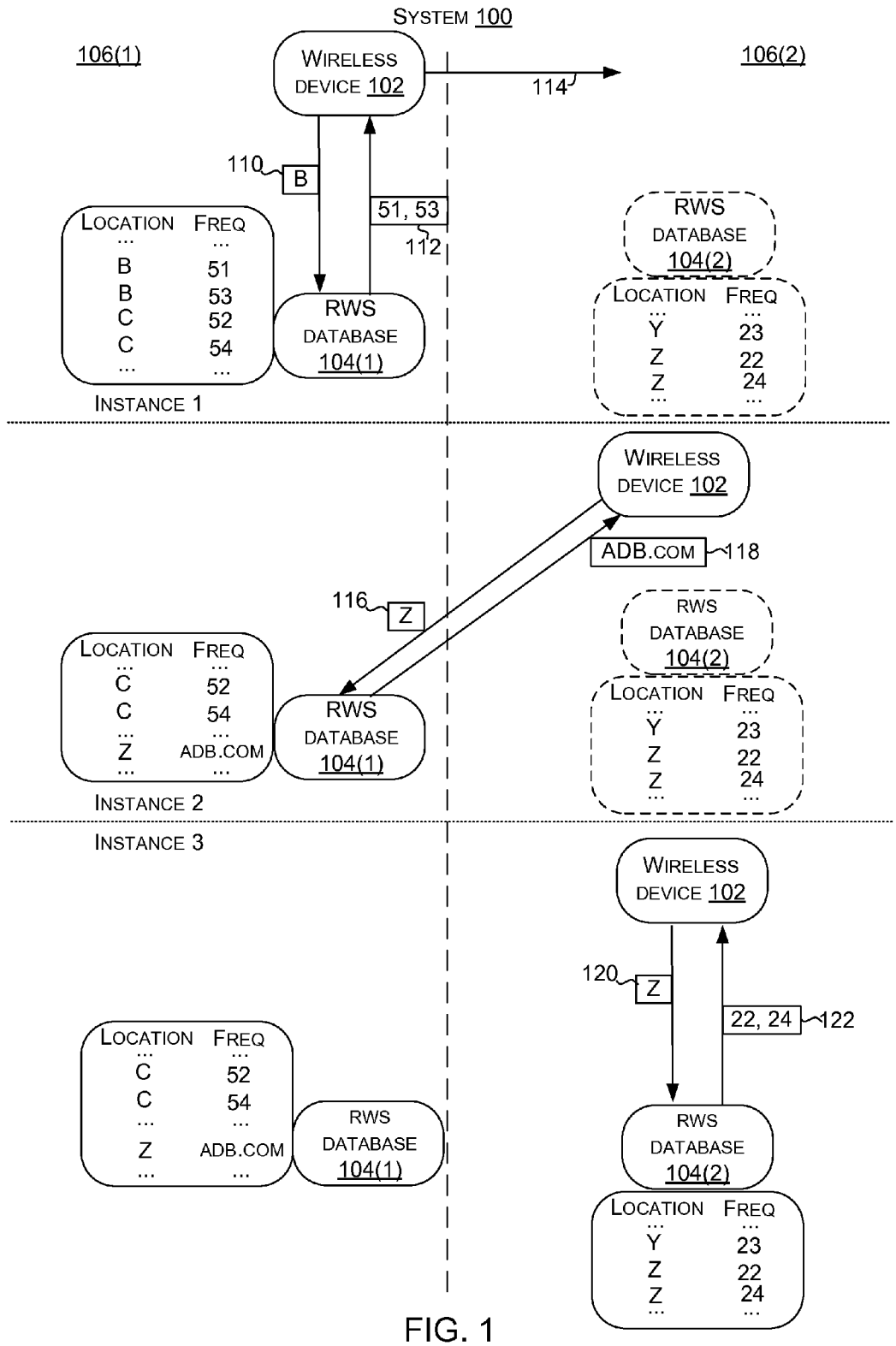
FIGS. 1-4 show examples of systems configured to utilize radio white space frequencies in accordance with some implementations of the present concepts.

For purposes of explanation consider introductory FIG. 1, which shows a scenario involving a system 100 where radio white space frequency (e.g., channel) discovery can be accomplished. System 100 can include a wireless device 102, and radio white space (RWS) databases 104(1) and 104(2). Assume for purposes of explanation that RWS database 104(1) covers geographical region 106(1) and RWS database 104(2) covers geographical region 106(2) (e.g., left and right of the vertical dashed line, respectively).

Assume further that wireless device 102 wants to utilize a radio white space frequency (RWSF) for data communication. For instance, the wireless device may want to function as a wireless access point (AP) and establish a wireless network on an individual radio white space frequency(s). Alternatively or additionally, the wireless device may want to find a network on a radio white space frequency(s) and utilize the network for data communication. In either case, wireless device 102 knows how to contact RWS database 104(1). For instance, the wireless device may have been sold in geographic region 106(1). As such, a URL for RWS database 104(1) may be included in code or as data on the wireless device. At this point, the wireless device may not be aware of, or include any information about, RWS database 104(2). As such, RWS database 104(2) is shown in ghost (e.g., dashed lines rather than solid lines).

At instance 1, wireless device 102 can send its location (e.g., hypothetical location "B") to RWS database 104(1) as indicated at 110. The RWS database 104(1) can return a set of RWSFs (51, 53) available at location B as indicated at 112. The wireless device can use one or more of the returned set of RWSFs for data communication. Note that at 112, the RWS database can also return constraints associated with use of individual RWSFs. For sake of brevity, the constraints are not shown or discussed until FIG. 3.

Now assume that wireless device 102 moves from geographic region 106(1) to geographic region 106(2) as indicated at 114. The wireless device can no longer use the set of RWSFs (51, 53) since it changed location.

As indicated at Instance 2, if the wireless device 102 once again wants to utilize RWSFs, the wireless device can query for available RWSFs. Assume that the wireless device is now at hypothetical location Z. The wireless device 102 can query RWS database 104(1) with its location Z as indicated at 116. However, RWS database 104(1) does not list available RWSFs for location Z since this location is outside of geographical region 106(1). However, RWS database 104(1) can include a listing for how to contact a RWS database (e.g., RWS database 104(2)) that does cover (e.g., have listings for) this location. In this example, RWS database 104(1) references location Z to hypothetical website adb.com (e.g., another database dot corn) as indicated at 116. The RWS database 104(1) can return this information to the wireless device as indicated at 118.

In Instance 3, the wireless device 102 can contact RWS database 104(2) as indicated at 120 utilizing the contact information obtained from RWS database 104(1). Thus, at this point wireless device 102 is aware of RWS database 104(2), which is now shown in solid rather than dashed lines to reflect this change. The wireless device can query RWS database 104(2) with its (e.g., the wireless device's) location Z. The RWS database 104(2) can then send a set of RWSFs (22, 24) to wireless device 102 as indicated at 122. The wireless device 102 can then attempt to utilize individual RWSFs (22, 24) obtained from RWS database 104(2) for data communication.

In summary, the present implementation can allow a wireless device to call a single RWS database with the device's location. The RWS database can either return RWSFs for the location or information about another RWS database that lists RWSFs for the location (or can return both the former and the latter). Thus, the wireless device can simply default to contacting a single RWS database. The wireless device does not have to be aware of, or select between, multiple RWS databases to contact. Note that while the RWSF aspects of the database and the wireless device are discussed, the RWS databases may alternatively or additionally contain information about other radio frequencies. Similarly, the wireless device may be using other frequencies beyond the discussed RWSFs.

Also note as used herein, a "wireless device" can be thought of as a device that has wireless capabilities. As such, a smart phone can be a wireless device. A wireless router that can communicate wirelessly and is also configured to be physically connected to a network, such as by an Ethernet cable can also be a wireless device.

Figure 2:
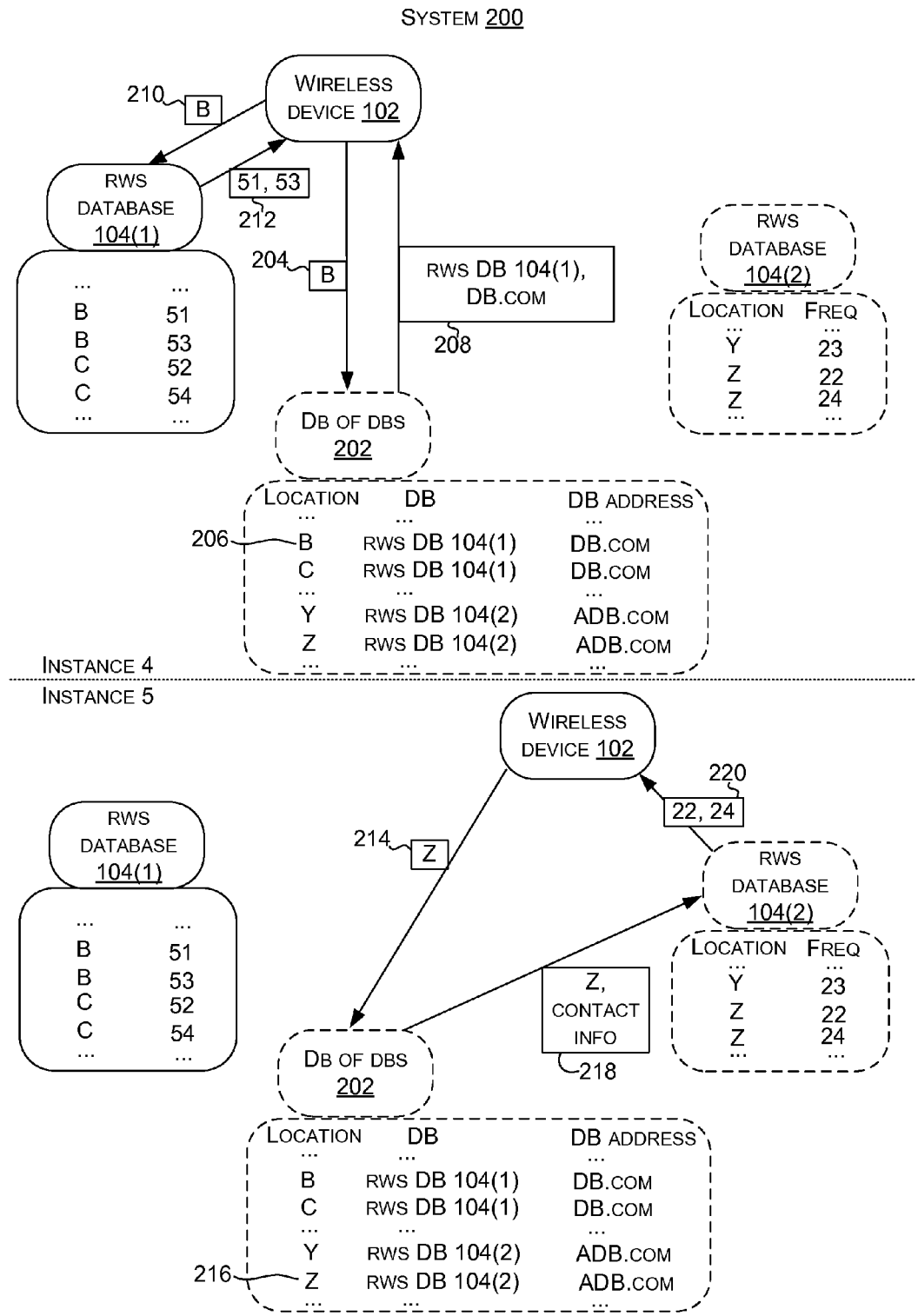

FIG. 2 shows another system 200 where RWSF discovery can be accomplished. System 200 retains the wireless device 102 and the RWS databases 104(1) and 104(2) of FIG. 1. System 200 also introduces a database of databases (DB of DBs) 202. In this case, RWS databases 104(1) and 104(2) can relate to geographic regions as discussed relative to FIG. 1. Alternatively, RWS database 104(1) may simply relate a first set of locations to available RWSFs and RWS database 104(2) may simply relate a second set of locations to available RWSFs.

In the illustrated configuration, the wireless device 102 can determine its location. At Instance 4, for purposes of explanation, assume that the wireless device is once again at location B. Rather than contacting a specific RWS database 104 (1) or 104(2), the wireless device can contact the database of databases 202 with its (e.g., the wireless device's) location as indicated at 204. An individual row of the database of databases 202 can map the location to the respective RWS database that covers that location. In this case, row 206 indicates that location "B" is covered by "RWS database 104(1)" and the address of this database is hypothetical URL "DB.com". Information from row 206 can be returned to wireless device 102 as indicated at 208. The wireless device can use this information to contact the RWS database indicated in the information. In this case, the wireless device can query RWS database 104(1) at "DB.com" with its location as indicated at 210. RWS database 104(1) can return a set of available RWSFs to the wireless device as indicated at 212.

At instance 5, wireless device 102 has moved from location B to location Z. The process described above relative to Instance 1 could be repeated except that the database of databases 202 would direct the wireless device to RWS database 104(2) based upon the location information. Instance 5 illustrates an alternative configuration. In this case, the wireless device 102 sends its location Z to the database of databases as indicated at 214. Row 216 indicates that this location is handled by RWS database 104(2) which can be contacted at URL ADB.com. In this case, the database of databases can contact RWS database 104(2) on behalf of the wireless device. The database of database can send the location Z and contact information for the wireless device as indicated at 218. The RWS database 104(2) can send a set of radio white space frequencies (22, 24) to the wireless device 102 as indicated at 220.

In summary, the database of databases 202 can be known to the wireless device 102. The wireless device does not need to know what geographic region it is in, or need to be aware of RWS databases. The wireless device 102 can simply default to contacting the database of databases 202. The database of databases can allow the wireless device to communicate with the appropriate RWS database to obtain a set of radio white space frequencies for its location. Thus, this configuration can allow the wireless device to be moved around the world without being configured to know how to contact multiple different databases and how to select a particular database in a given circumstance. Instead, the wireless device 102 simply contacts the database of databases 202 with its location.

Figure 3:
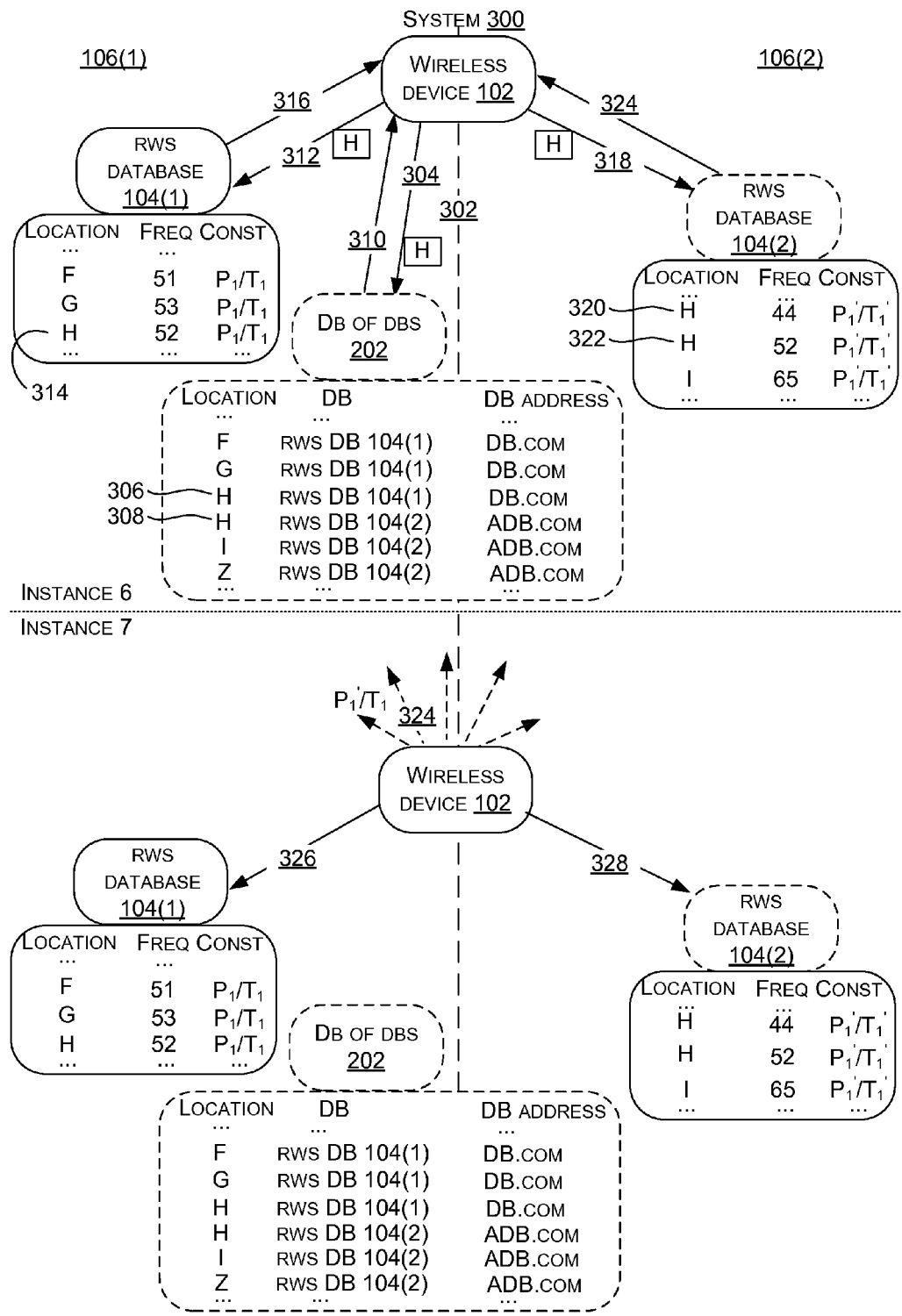

FIG. 3 shows another system 300 where RWSF discovery can be accomplished. FIG. 3 addresses using RWSFs in border regions. For ease of explanation, system 300 retains several of the elements introduced above relative to FIGS. 1 and 2. However, the border usage concepts are not tied to these specific elements.

In this case, assume that wireless device 102 is at a location H that is proximate to, or on, a border 302 between geographic region 106(1) and geographic region 106(2). RWS database 104(1) controls use of RWSFs in geographic region 106(1). RWS database 104(2) controls use of radio whites space frequencies in geographic region 106(2). In this case, wireless device 102 queries the database of databases 202 with its location H as indicated at 304. Row 306 indicates that RWS database 104(1) covers location H. Similarly, row 308 indicates that RWS database 104(2) covers location H. The database of databases 202 can return both RWS database 104(1) and RWS database 104(2) to the wireless device at 310.

The wireless device 102 queries RWS database 104(1) with its location H as indicated at 312. Row 314 of RWS database 104(1) lists RWSF 52 for location H as well as power constraint $P_1$ and time constraint $T_1$. RWS database 104(1)

returns the frequency and associated constraints to the wireless device as indicated at 316.

Similarly, the wireless device 102 queries RWS database 104(2) with its location H as indicated at 318. Row 320 of RWS database 104(2) lists RWSF 44 for location H as well as power constraint $P_1'$ and time constraint $T_1'$. Row 322 of RWS database 104(2) lists RWSF 52 for location H as well as power constraint $P_1'$ and time constraint $T_1'$. RWS database 104(2) returns the RWSFs and associated constraints to the wireless device as indicated at 324.

At this point, wireless device 102 can analyze the returned RWSF information for location H. First, the wireless device can look for a frequency that is common to both RWS databases 104(1) and 104(2). In this case RWS database 104(1) supplied RWSF 52. RWS database 104(2) supplied RWSFs 44 and 52. RWSF 52 is common to both databases and thus is useable at location H. (Use of RWSF 44 is precluded since its use is not allowed at that location according to RWS database 104(1)). Further, any use of RWSF 52 has to satisfy both RWS databases 104(1) and 104(2). Thus, the wireless device can now look at the constraints. Any use of the RWSF has to satisfy the lower (or lowest in the case of three regulatory databases) constraint value. For example assume in this example that power constraint $P_1$ and time constraint $T_1$ from RWS database 104(1) have values of 0.2 Watt and 2 hours, respectively and power constraint $P_1'$ and time constraint $T_1'$ from RWS database 104(2) have values of 0.1 Watts and 24 hours, respectively. In this case, the lower power constraint value is 0.1 and the lower time constraint value is 2 hours. Thus, the wireless device can utilize RWSF 52 at a power of 0.1 Watts for a time (e.g., duration) of 2 hours. These values satisfy both RWS databases 104(1) and 104(2). Of course, other types of constraints can be encountered.

Instance 7 shows the wireless device 102 using frequency 52 at power $P_1'$, $T_1$ as indicated at 324. The wireless device can then repeat the queries to the RWS databases 104(1) and 104(2) at or before the expiration of 2 hours time if further use is desired as indicated at 326 and 328, respectively. When summarized from one perspective, the present concepts can allow the wireless device to utilize RWSFs in situations that involve multiple controlling databases. The wireless device can select RWSFs and utilize the RWSFs in a manner that complies with all of the databases involved.

Note that there are various scenarios where multiple RWS databases may be encountered for a given location. For instance, in some cases a single country or regulatory region may include multiple RWS databases (e.g., a single region with multiple databases) that cover the location. In other cases, such as the border case illustrated and described relative to FIG. 3, there can be multiple regions that each include an RWS database(s) (e.g., multiple regions each having one or more databases) that cover the location.

Figure 4:
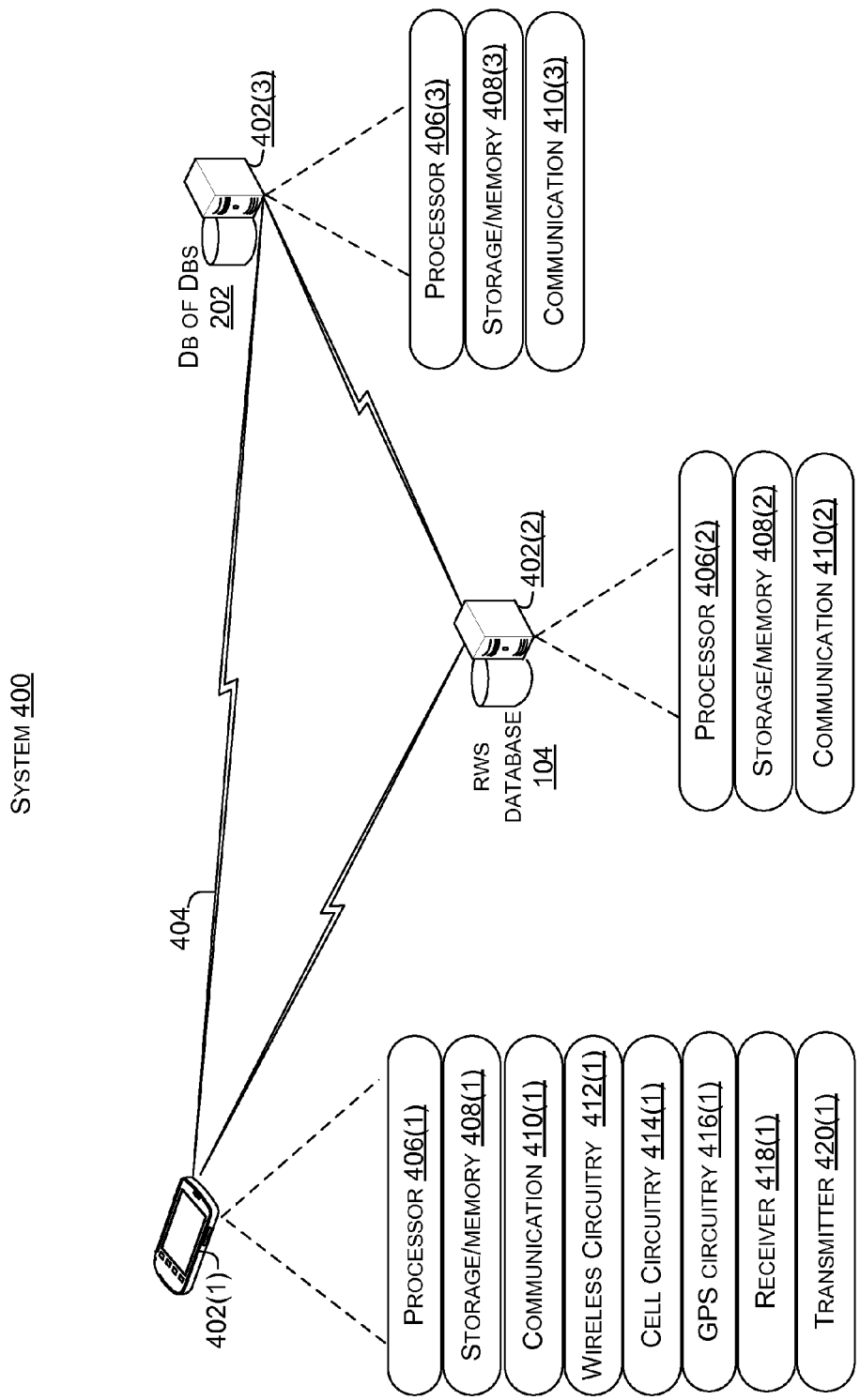

FIG. 4 shows system 400 that can enable the RWSF discovery concepts described above. Further, system 400 can include multiple devices 402. Device 402(1) can be similar to wireless device 102 that is described above. Device 402(2) can be a computing device associated with RWS database 104. Device 402(3) can be a computing device associated with database of databases 202. (In this discussion, the use of a designator with the suffix, such as "(1)", is intended to refer to a specific device instance. In contrast, use of the designator without a suffix is intended to be generic). Of course, not all device implementations can be illustrated and other device implementations should be apparent to the skilled artisan from the description above and below.

Devices 402 can communicate over one or more networks represented by lightning bolts 404. The devices 402 can include several elements which are defined below. For example, these devices can include a processor 406, storage/memory 408, and a communication component 410.

The devices 402 can also include other elements. Some of these elements are discussed relative to device 402(1), but some or all of these elements can occur on the other devices 402(2) or 402(3). In this case, device 402(1) can include (or be communicatively coupled with) wireless circuitry 412(1), cell circuitry 414(1), GPS circuitry 416(1), a receiver 418(1), and a transmitter 420(1), among others. The devices can alternatively or additionally include other elements, such as input/output devices (e.g., touch, voice, and/or gesture), buses, graphics cards, etc., which are not illustrated or discussed here for sake of brevity.

Wireless circuitry 412(1) can facilitate communication over various radio frequencies, such as RWSFs, Wi-Fi frequencies, Bluetooth frequencies, etc. The cell circuitry 414(1) can be thought of as a subset of the wireless circuitry relating to cellular channels. The cellular circuitry can handle communications over cell data channels and cell control channels. The GPS circuitry 416(1) can utilize GPS satellite signals to calculate the device's location.

The receiver 418(1) and the transmitter 420(1) can function to transmit and receive data at various frequencies. For example, the receiver 418 and the transmitter 420 can be configured to operate at specific frequencies, such as 2.4 Giga Hertz frequency, 5.0 Giga Hertz frequency, 60 Giga Hertz frequency, radio frequencies, and/or TV channel frequencies (50 Mega Hertz to 810 Mega Hertz), among others. Alternatively, the transmitters and receivers can be configured to tune to any frequencies in the RF spectrum. While discrete components or elements are illustrated, some implementations may combine elements. For instance, wireless circuitry 412 may include dedicated transmitters and receivers rather than interfacing with distinct transmitters and receivers. The wireless circuitry 412(1), cell circuitry 414(1), GPS circuitry 416(1), receiver 418(1), and/or the transmitter 420(1) can be hardware based or a combination of hardware and software. The circuitry may utilize a system on a chip (SOC) configuration (described below).

Relative to device 402(1), the communication component 410(1) can utilize the GPS circuitry 416(1) to determine its location. Alternatively or additionally to GPS location identification, the communication component can cause triangulation (such as cell tower triangulation or Wi-Fi access point triangulation) to be performed to determine its location. The communication component can identify an interface to access the RWS database 104 and/or database of databases 202 with the location information. For instance, the communication component can access the Internet and utilize a uniform resource locator (URL) of the RWS database 104 and/or database of databases 202 to obtain a set of location-specific RWSFs.

In an instance where the accessed database returns information about another database that covers the location, the communication component 410(1) is further configured to query the another database. For instance, communication component 410(1) may send location information to database of databases 202. The database of databases may identify that RWS database 104 covers that location. The database of databases 202 can return contact information for RWS database 104 to device 402(1). Communication component 410(1) can receive this information and use it to query RWS database 104. In an instance where the database of databases 202 returns multiple RWS databases that cover the location, the communication component 410(1) can query each of the RWS databases. The communication component 410(1) can obtain sets of RWSFs from the queried RWS databases. The communication component can ensure that use of one or more of these RWSF frequencies complies with constraints of each of the RWS databases.

In some configurations, the communication component 410 can be installed as hardware, firmware, or software during manufacture of the device 402 or by an intermediary that prepares the device for sale to the end user. In other instances, the end user may install the communication component 410, such as in the form of a downloadable application.

The term "device", "computer", or "computing device" as used herein can mean any type of device that has some amount of processing capability and/or storage capability. Processing capability can be provided by one or more processors (such as processor 406) that can execute data in the form of computer-readable instructions to provide a functionality. Data, such as computer-readable instructions, can be stored on storage, such as storage/memory 408 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices can include traditional computing devices, such as servers, personal computers, desktop computers, notebook computers, cell phones, smart phones, personal digital assistants, pad type computers, mobile devices, wireless devices, cameras, routers, or any of a myriad of ever-evolving or yet to be developed types of computing devices. A mobile computer or mobile device can be any type of computing device that is readily transported by a user and may have a self-contained power source (e.g., battery). Similarly, a wireless device can be any type of computing device that has some capability to communicate with other devices without being physically connected to them. In some cases, a wireless device may have both wireless and wired capabilities. For instance, a router can be physically connected to a network, such as with an Ethernet cable, and wirelessly communicate with devices over radio frequencies, such as RWSF frequencies and/or Wi-Fi frequencies, among others.

In the illustrated implementation, devices 402 are configured with a general purpose processor 406 and storage/memory 408. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (CPUs), controllers, microcontrollers, processor cores, or other types of processing devices suitable for implementation both in conventional computing architectures as well as SOC designs.

Note that some implementations can utilize information about a device, such as location information. Any such information gathering can be conducted in a manner that protects the security and privacy of the user. The user can be given notice of the use and allowed to opt-in, opt-out, and/or define such use. In any event, the present implementations can be accomplished in a manner that utilizes the information in a very targeted manner that limits the use of the information to accomplishing the present radio white space frequency utilization concepts.

Method Examples

Figure 5:
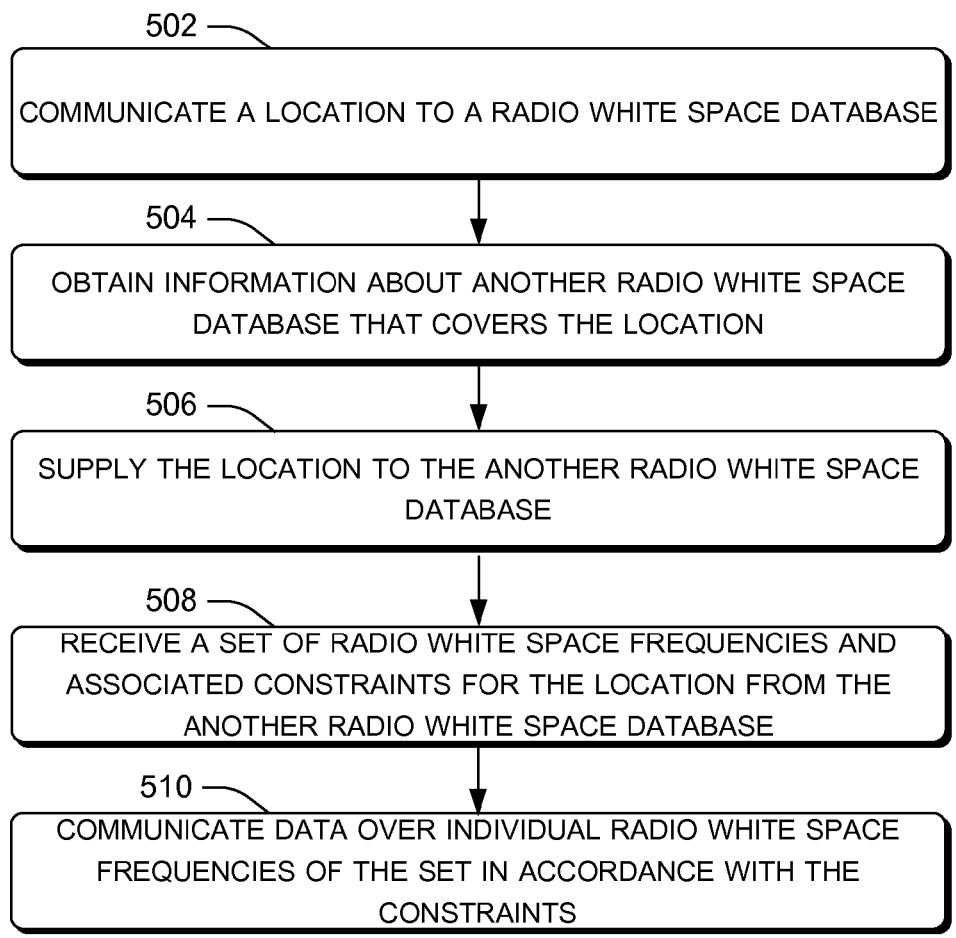
FIGS. 5-6 are flowcharts of examples of radio white space frequency utilization techniques in accordance with some implementations of the present concepts.

FIG. 5 shows a method 500 for utilization of radio white space frequencies.

The method can communicate a location to a radio white space database at 502. The communication can be achieved over various interfaces. For instance, the communication can be accomplished over a Wi-Fi frequency, cellular frequency, and/or wired access, among others. In some cases a mobile device can determine its location and communicate the location to the radio white space database in a query for radio white space frequencies. In some cases, the radio white space database can relate only to radio white space frequencies. In other cases, the radio white space database can relate to radio white space frequencies and/or other radio frequencies. For instance, the radio white space database may also include listings of Wi-Fi frequencies, Bluetooth frequencies, and/or cellular services, among others, that are available at individual locations. In some configurations, the radio white space database can be a regulatory radio white space database established by a governmental or quasi-governmental entity. In other cases, the radio white space database can be controlled by a private entity, such as a cellular service provider.

In some cases, the radio white space database that is contacted can be thought of as a database of databases that maps locations to appropriate databases (e.g., radio white space databases that cover the location).

The method can obtain, from the radio white space database, information about another (e.g., an appropriate) radio white space database that covers the location at 504. In some cases, the information can include a uniform resource locator (URL) (e.g., link) of a website associated with the appropriate radio white space database. Thus, communication can be established with the radio white space database which can return a link to the appropriate radio white space database that covers the location.

In some instances, such as at border regions, there may be multiple radio white space databases that cover the location. A link can be returned for each of these 'appropriate' radio white space databases. For instance, first and second radio white space databases can cover the location. For example, the first radio white space database covers a first geographic region and the second radio white space database can cover a second adjacent geographic region. The location may be at or proximate to the border between the two regions. In this case the term 'proximate' can be defined by constraints of the radio white space databases. For instance, in one scenario the databases could require that the location be accurate to within 100 meters. In such a case, any location within 100 meters of the border can be covered by both databases.

In the above mentioned configuration, the links for the appropriate databases that cover the location are returned to the mobile device. In another configuration, the communication may be forwarded to the appropriate database(s) that cover the location. Information can be included about the mobile device to allow the appropriate database(s) to communicate back to the mobile device.

The method can supply the location to the another (e.g., appropriate) radio white space database at 506. In the example above, a link to the appropriate database for the location can be returned to the mobile device. The mobile device can then query the appropriate database using the link.

The mobile device can supply its location to the appropriate database. The appropriate database can then send a set of radio white space frequencies for the location along with other constraints.

The method can receive a set of radio white space frequencies and associated constraints for the location from the another (e.g., appropriate) radio white space database at 508. Thus, at this point the mobile device can receive the set of radio white space frequencies for the location along with other constraints sent by the appropriate database.

While at the location, the method can communicate data over individual radio white space frequencies of the set in accordance with the constraints at 510. As mentioned above, in some instances the location is proximate to a border between the first geographic region and the second geographic region. In these cases, the communication can comply (e.g., be in accordance) with the constraints of multiple radio white space databases that share the border.

Figure 6:
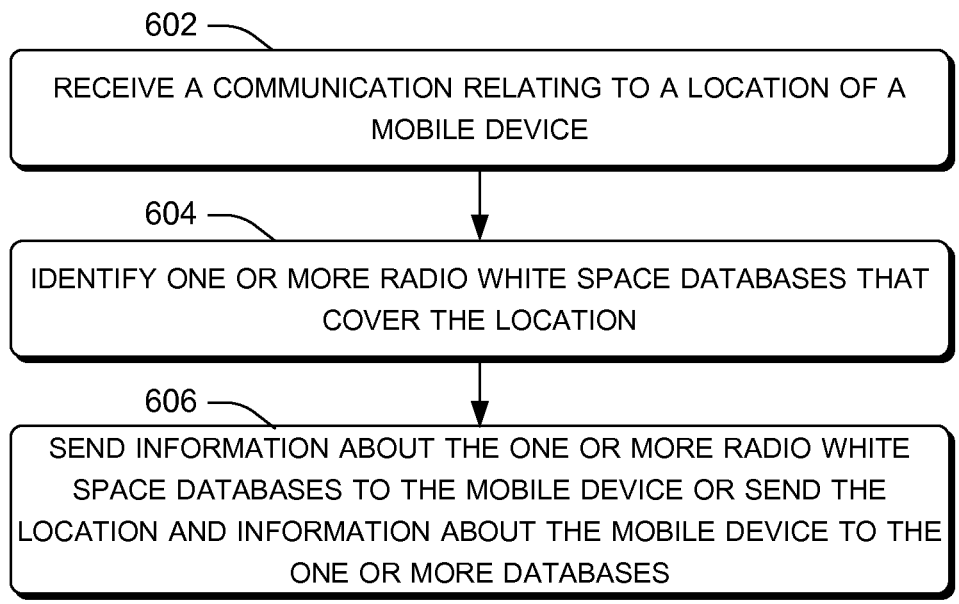

FIG. 6 shows a method 600 for utilization of radio white space frequencies.

The method can receive a communication relating to a location of a mobile device at 602. In some cases, the communication can be received from the mobile device. In other cases, the communication can be received from another entity, such as a service provider that has a relationship with the mobile device.

The method can identify one or more radio white space databases that cover the location at 604. In some cases, the identifying can be accomplished by accessing a database of databases that associates locations to radio white space databases.

The method can send information about the one or more radio white space databases to the mobile device or send the location and information about the mobile device to the one or more databases at 606.

In some cases, individual radio white space databases can be regulatory databases. In other cases, individual radio white space databases can be controlled by a third party. In some cases, blocks 602-606 can be performed by a database of databases that maps locations to radio white space databases that cover the locations.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

Conclusion

Although techniques, methods, devices, systems, etc., pertaining to utilization of radio white space frequencies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   receiving, at a database of databases, a communication relating to a location of a mobile device;
   identifying one or more radio white space databases that cover the location, the one or more radio white space databases being established by governmental institutions associated with countries proximate to the location; and,
   sending the location and contact information for the mobile device from the database of databases to the one or more radio white space databases.

2. The method of claim 1, wherein the receiving comprises receiving the communication from the mobile device.

3. The method of claim 1, wherein the identifying comprises accessing the database of databases and wherein the database of databases associates locations to radio white space databases.

4. The method of claim 3, wherein the database of databases contacts the one or more radio white space databases on behalf of the mobile device to obtain a set of radio white space frequencies for use at the location.

5. The method of claim 1, wherein the identifying further comprises identifying the countries that are proximate to the location.

6. The method of claim 1, performed by the database of databases.

7. A system, comprising:
   one or more processors; and
   one or more storage devices storing computer-readable instructions which, when executed by the one or more processors, cause the one or more processors to:
   receive, at a database of databases, a location of a mobile device;
   identify one or more radio white space databases that cover the location, the one or more radio white space databases being established for a region proximate to the location; and,
   send the location and contact information for the mobile device from the database of databases to the one or more radio white space databases.

8. The system of claim 7, wherein the computer-readable instructions further cause the one or more processors to receive the location over a Wi-Fi frequency.

9. The system of claim 7, wherein the database of databases relates only to radio white space frequencies or wherein the database of databases relates to radio white space frequencies and other radio frequencies.

10. The system of claim 7, wherein the one or more radio white space databases comprise at least one regulatory radio white space database established by a government institution and the region is a country associated with the government institution.

11. The system of claim 7, wherein the one or more radio white space databases send a set of radio white space frequencies to the mobile device.

12. The system of claim 7, wherein the database of databases is stored on the one or more storage devices and maps locations to radio white space databases.

13. The system of claim 7, wherein the one or more radio white space databases comprise multiple radio white space databases established by government institutions associated with respective countries that are included in the region.

14. The system of claim 7, wherein the computer-readable instructions further cause the one or more processors to receive the location from a service provider that has a relationship with the mobile device.

15. The system of claim 7, wherein the computer-readable instructions further cause the one or more processors to receive the location from the mobile device in a query for a radio white space frequency on which to communicate.

16. A system, comprising:
- memory and a processor configured to execute instructions stored on the memory; and,
- a database of databases configured to:
  - receive a query from a wireless device to obtain a set of radio white space frequencies, the query including a location of the wireless device,
  - in response to the query, identify one or more radio white space databases that cover the location, and
  - send the location and contact information for the wireless device from the database of databases to the one or more radio white space databases.

17. The system of claim 16, wherein the one or more radio white space databases relate to a single country that contains the location.

18. The system of claim 16, wherein the one or more radio white space databases comprise:
- a first radio white space database that relates to a first geographic region that contains the location, and
- a second radio white space database that relates to a second geographic region that borders the first geographic region, wherein the location is proximate to the border.

19. The system of claim 16, wherein the one or more radio white space databases include at least one radio white space database controlled by a private entity.

20. The system of claim 16, wherein the database of databases is further configured to send information about the one or more radio white space databases to the wireless device.

\* \* \* \* \*